United States Patent [19]
Mahoney

[11] Patent Number: 5,231,676
[45] Date of Patent: Jul. 27, 1993

[54] HIERARCHICAL OPERATIONS ON BORDER ATTRIBUTE DATA FOR IMAGE REGIONS

[75] Inventor: James V. Mahoney, Sunnyvale, Calif.

[73] Assignee: Xerox Corporation, Stamford, Conn.

[21] Appl. No.: 535,213

[22] Filed: Jun. 8, 1990

[51] Int. Cl.$^5$ .............................................. G06K 9/00
[52] U.S. Cl. ...................................... 382/22; 382/11; 382/21
[58] Field of Search .............................. 382/11, 21, 22

[56] References Cited

U.S. PATENT DOCUMENTS

| | | | |
|---|---|---|---|
| 4,566,124 | 1/1986 | Yamamoto et al. | 382/22 |
| 4,771,469 | 9/1988 | Wittenburg | 382/25 |
| 4,771,474 | 9/1988 | Takashima et al. | 382/22 |
| 5,014,331 | 5/1991 | Kurogane et al. | 382/48 |
| 5,022,091 | 6/1991 | Carlson | 382/49 |

FOREIGN PATENT DOCUMENTS 257550A  3/1988  European Pat. Off. .

OTHER PUBLICATIONS

European Search Report and Annex, EP 9130 5166, Sep. 13, 1991.
Mahoney, J. V., Image Chunking: Defining Spatial Building Blocks for Scene Analysis, Dep't. of Elec. Eng. and Comp. Sci., M.I.T., 1987 ("the Mahoney thesis"), pp. 8-25.
Wocjik, Z. M., "An Approach to the Recognition of Contours and Line-Shaped Objects," *Computer Vision, Graphics, and Image Processing*, 25, 1984, pp. 184-204.

Primary Examiner—Leo H. Boudreau

[57] ABSTRACT

A hierarchy of border attribute data items is produced from a body of data such as the pixel values of an image. Each border attribute data item indicates an attribute of a border of an analysis region of the image. The starting border attribute data items, at the lowest level of the hierarchy, are produced by operation on the pixel values. Each border attribute data item at a higher level in the hierarchy is produced by operating on a respective set of data items from the next lower level. The border attribute data items can indicate, for example, the number of black pixels in each border or the number of edge pixels in each border. Or the border attribute data items could include boolean values indicating whether any of the pixels in a border is a black pixel with a neighboring black pixel outside the border. For rectangular regions in a binary hierarchy, values for two borders can be added or logically combined at a first level and one of the values for the same two borders can be selected at the next higher level; one of the values for the other two borders can be selected at the first level and the values for those two borders can be added or logically combined at the next higher level.

12 Claims, 8 Drawing Sheets

|   | 1 | 2 |
|---|---|---|
| 1 | 0,1,0,1 | 0,0,0,0 |
| 2 | 0,0,0,1 | 1,1,0,0 |

72

|   | 1 | 2 |
|---|---|---|
| 1 | 0,1,0,2 | 0,1,0,0 |
| 2 | 0,0,0,1 | 1,1,0,0 |

74

|   | 1 | 2 |
|---|---|---|
| 1 | 0,1,0,2 | 0,0,0,0 |
| 2 | 1,1,0,1 | 1,0,0,0 |

|   | 1 | 2 |
|---|---|---|
| 1 | 1,0,1,0 | 0,0,0,0 |
| 2 | 1,1,1,0 | 0,0,1,1 |

82

|   | 1 | 2 |
|---|---|---|
| 1 | 1,1,1,0 | 0,0,1,1 |
| 2 | 1,1,0,1 | 0,1,0,1 |

84

|   | 1 | 2 |
|---|---|---|
| 1 | 1,0,1,0 | 0,0,1,1 |
| 2 | 1,1,0,1 | 0,0,0,1 |

HIERARCHICAL OPERATIONS ON BORDER ATTRIBUTE DATA FOR IMAGE REGIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data. More specifically, the invention relates to techniques that analyze an image by operating on regions of the image.

Mahoney, J. V., *Image Chunking: Defining Spatial Building Blocks for Scene Analysis*, Dep't. of Elec. Eng. and Comp. Sci., M.I.T., 1987 ("the Mahoney thesis"), describes an image chunk as a subset of an image that can act as a unit in the course of spatial analysis. As described at page 11, parallel preprocessing constructs a variety of simple chunks uniformly over a visual array. On the basis of these chunks, subsequent serial processes rapidly locate relevant scene components and rapidly assemble detailed descriptions of them. Section 1.4, pages 20-22, describes parallel connectivity algorithms based on global parallel models and based on simple local models.

SUMMARY OF THE INVENTION

One aspect of the invention is based on the recognition of a problem in obtaining data indicating an attribute of a region by simple, local operations. In contrast to global operations, simple, local operations are consistent with massively parallel or rapid serial implementation. But the previously proposed local operations do not indicate all the useful attributes of a region.

This aspect of the invention is further based on the discovery of an additional group of local operations that produce data indicating a number of useful attributes. Each of these operations hierarchically combines data indicating an attribute of a region border. The border attributes can in turn be used to determine attributes of a region, such as topological attributes.

A closely related aspect of the invention is based on the recognition that an operation combining border attribute data hierarchically can, at each level, combine some values from the next lower level by addition or logical combination and others by selection. For example, in a binary hierarchy of rectangular regions, border edge counts and border pixel counts can be combined in this manner. For example, if top and bottom subregions are being combined to form a region, the values for the subregions' right borders can be added or logically combined and the values for their left borders can be added or logically combined to produce values for the right and left borders of the region, respectively, while the value for the top subregion's upper border and the value for the bottom subregions lower border can be selected to produce values for the upper and lower borders of the region, respectively. A similar approach could be applied in combining right and left subregions in a binary hierarchy, or in combining a larger group of subregions such as in a quadtree.

Another closely related aspect of the invention is based on the recognition of problems in chunking an image into connected component regions. The technique described in the Mahoney thesis can identify a region that contains a single connected component, also called a valid region, but only if the image includes only thin connected components, with any black pixel having no more than two neighboring black pixels. Using this techniques, two valid regions combine to form a valid region if their connected components are connected. This technique cannot be applied directly to most images of practical interest, because most images include connected components that are not thin. An image that includes non-thin components requires a preprocessing step in which thinning is performed on the image before the operation that finds connected component regions. Furthermore, the Mahoney thesis did not propose a hierarchical way to determine that components in neighboring regions are connected.

This aspect is further based on the discovery of a hierarchical technique for identifying single connected component regions in which the connected components are not required to be thin. This technique is based on the recognition that a region that is the union of two adjacent valid subregions is valid if the components in the subregions are connected, meaning that either connected component crosses the boundary of its subregion that is adjacent to the other subregion. For each subregion, a border crossing data item indicates whether its component crosses a border. The border crossing data items of the subregions are used to determine if the region that is their union is valid. If so, the subregions's border crossing data items are combined to produce the border crossing data item of the region that is their union. The following description, the drawings, and the claims further set forth these and other objects, features, and advantages of the invention.

BRIEF DESCRIPTION OF THE DRAWINGS

FIG. 4 illustrates a technique for hierarchically counting border edge pixels of respective regions of increasing size.

FIG. 5 illustrates a technique for hierarchically determining connectedness of respective regions of increasing size.

DETAILED DESCRIPTION

A. Conceptual Framework

Figure 1:
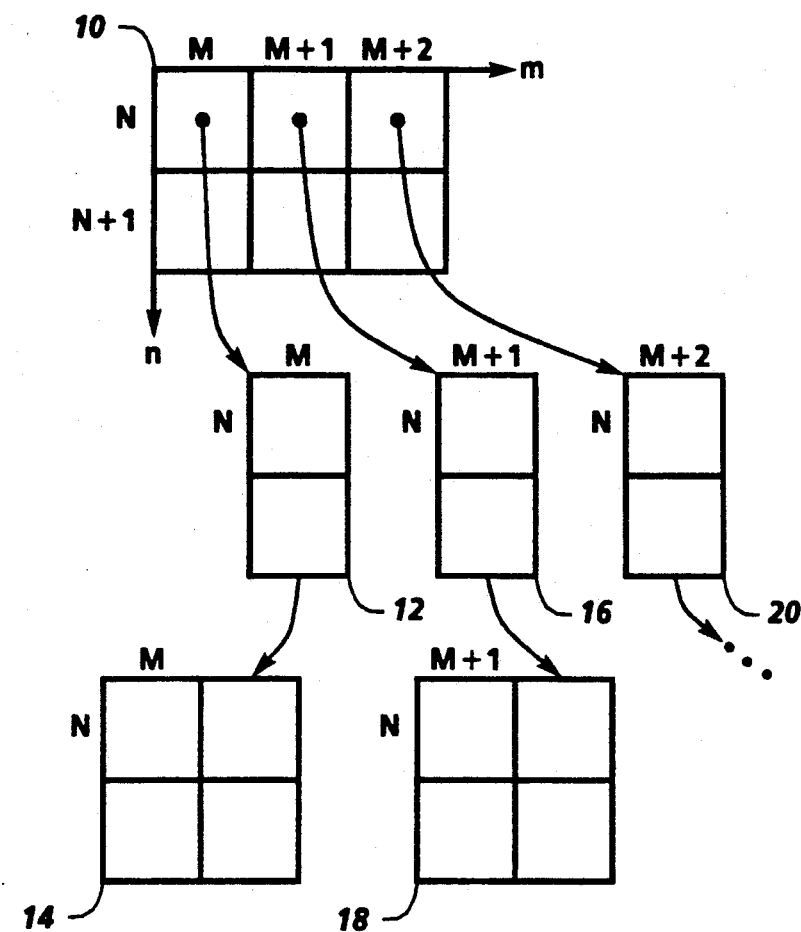
FIG. 1 shows, for each of several pixels in an image, a sequence of respective regions of increasing size.

The following conceptual framework is helpful in understanding the broad scope of the invention, and the terms defined below have the meanings indicated throughout this application, including the claims. This conceptual framework is an extension of that set forth in copending, coassigned U.S. patent application Ser. No. 07/535,796, entitled "Dense Aggregative Hierarchical Techniques for Data Analysis" ("the architecture application"), which is incorporated herein by reference in its entirety.

A "data processor" or "processor" is any component, combination of components, or system that can process data, and may include one or more central processing units or other processing components. A "processing unit" is a processor that is a component within another processor. Two processing units are "connected" by any combination of connections between them that permits communication of data from one of the processing units to the other.

"Memory" is any component, combination of components, or system that can store data, and may include local and remote memory and input/output devices.

A processor "accesses" data or a data structure by any operation that retrieves or modifies the data or data included in the data structure, such as by reading or writing data at a location in memory. A processor can be "connected for accessing" data or a data structure by any combination of connections with memory that permits the processor to access the data or the data structure.

A "data structure" is any combination of interrelated items of data. An item of data is "included" in a data structure when it can be accessed using the locations or data of other items in the data structure; the included item of data may be another data structure. An "array of data" or "data array" or "array" is a data structure that includes items of data that can be mapped into an array. A "two-dimensional array" is a data array whose items of data can be mapped into an array having two dimensions.

A processor "operates on" data or a data structure by performing an operation that includes obtaining a logical or numerical result that depends on the data or data structure.

To "obtain" or "produce" data or a data structure is to perform any combination of operations that begins without the data or the data structure and that results in the data or data structure. Data or a data structure can be "obtained from" or "produced from" other data or another data structure by any combination of operations that obtains or produces the data or data structure by operating on the other data or on data in the other data structure. For example, an array can be obtained from another array by operations such as producing a smaller array that is the same as a part of the other array, producing a larger array that includes a part that is the same as the other array, copying the other array, or modifying data in the other array or in a copy of it.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the beginning. In other words, a hierarchy may be produced by a combination of operations that ends when all of the data items of the hierarchy have been produced, whether or not all of the data items are still stored. Al of the data items of all of the levels could still be stored at the end of the operations, but the hierarchy is produced even though some of the data items are not stored after being used to produce data items at a higher level.

To produce a hierarchy "sequentially" is to produce the hierarchy by a sequence of substeps in which the first substep produces a first higher level of data items from a lowest level of data items, the second substep produces a second higher level of data items from the first higher level, and so forth.

Data "indicates" an attribute when the data indicates the presence of the attribute or a measure of the attribute. An "aggregative data item" is an item of data that indicates an attribute of a group of other data items. In a hierarchy of data items, a given level can include aggregative data items, each of which indicates an attribute of a respective group of data items of the next lower level of the hierarchy.

An "aggregative operation" is an operation on a set of data items, called input data items below, that produces a set of aggregative data items, called resulting data items below, with each of the aggregative data items being produced by operating on a respective set of the input data items. The respective sets of input data items are "evenly distributed" in relation to the complete set of input data items if each of the input data items is included in roughly the same number of respective sets of input data items as every other input data item and if no two of the respective sets are identical.

If the respective sets of input data items on which an aggregative operation is performed are all of the same size $\alpha$, the "aggregation degree" of the aggregative operation is equal to $\alpha$. More generally, the respective sets of input data items could each have one of a small number of different sizes $\alpha_1, \alpha_2, \ldots$ For the aggregative operations discussed below, $\alpha$ is generally greater than 1 and small compared to the number of input data items, except as otherwise indicated.

The "density" of an aggregative operation is the ratio c of the number of resulting data items to the number of input data items. This ratio can be related to the aggregation degree $\alpha$ as follows, assuming in each case that the respective sets are evenly distributed. A "minimal aggregative operation" is one for which c is approximately equal to $1/\alpha$, so that each of the input data items is in one of the respective sets of input data items. A "dense aggregative operation" is one for which c is not substantially less than 1, so that each of the input data items is in not substantially less than $\alpha$ respective sets of input data items. An "exhaustive aggregative operation" is a dense aggregative operation for which c is equal to 1, so that each of the input data items is in $\alpha$ respective sets of input data items.

A "hierarchical aggregative operation" is a combination of operations that sequentially produce a hierarchy and in which each substep of the sequence is an aggregative operation. An "aggregative hierarchy" is a hierarchy produced by a hierarchical aggregative operations. An aggregative hierarchy can be described as "minimal," "exhaustive," or "dense" if all of the substeps of the hierarchical aggregative operation that produces it are minimal, exhaustive, or dense, respectively. A "mixed aggregative hierarchy" is produced by a hierarchical aggregative operation that includes aggregative operations of varying densities, possibly including minimal, exhaustive, and other densities that are between minimal and exhaustive or greater than exhaustive.

An "image" is a pattern of light. Data "defines" an image or another signal when the data includes sufficient information to produce the image or signal. For example, an array can define all or any part of an image, with each item of data in the array providing a value indicating the color of a respective location of the image.

A "dimensioned body of data" is a body of data that maps into a space that includes one or more dimensions. For example, an array that defines a two-dimensional image is a dimensioned body of data. A "geometric structure" is a configuration of data items that occurs in a dimensioned body of data. Examples of geometric structures include points; relations among points; properties of points, such as color, surface orientation, or depth; configurations of points, such as lines and curves, line junctions, corners, angles, connected regions, region boundaries, surfaces, solids; and so forth.

Each location in an image may be called a "pixel." In a body of data defining an image in which each item of data provides a value, each value indicating the color of a location may be called a "pixel value." Each pixel value is a bit in the "binary form" of the image, a grey-scale value in a "grey-scale form" of the image, or a set of color space coordinates in a "color coordinate form" of the image, the binary form, grey-scale form, and color coordinate form each being a body of data defining the image.

A "connected component" or "blob" is a set of pixels in an image, all of which have pixel values that meet a criterion and all of which are pairwise connected through an appropriate rule such as that the pixels in a pair are connected by a chain of neighbors within the set. For example, a connected component of a binary form of an image can include a connected set of pixels that have the same binary value, such as black.

A "data space" is a space into which the data items of a dimensioned body of data can be mapped. In general, a number of bodies of data can be mapped into the same data space. For example, arrays defining many different images can all be mapped into the same two-dimensional data space.

An "analysis region" or "region" of a data space or of any of the bodies of data that can be mapped into the data space is a bounded part of the data space, defined without regard to the values of the data items mapped into the analysis region. A region of the array defining an image defines an analysis region of the image, so that an aggregative data item defines an attribute of an analysis region of an image when it indicates an attribute of the data items in an analysis region of the array defining the image. The attribute could, for example, be the presence of exactly one connected component in a respective analysis region. The size and position of the aggregative data item's respective analysis region do not depend on the presence or absence of a connected component, but rather on the set of data items on which operations are performed to produce the aggregative data item. An image is therefore divided into analysis regions by the aggregative operations performed on an array defining the image in a way that does not depend on the pixel values in the image. Typically, each pixel value is in at least one analysis region at the lowest level of the hierarchy, and the analysis regions of each higher level are formed by combining analysis regions of the next lower level. Analysis regions "overlap" if they share one or more pixels.

An item of data is produced by "combining" other items of data when logical or arithmetic operations are performed on the other items of data that yield an item of data of the same type. For example, if the other items of data are simple booleans, the combined item of data in a simple boolean. If the other items of data are numbers, the combined item of data could be a number, produced by adding the other items of data, calculating the mean of the other items of data, selecting one of the other items of data, or a similar operation that produces a number.

Data items in a pair are "disjoint" if the sets of data items on which operations are performed in producing each of them are mutually exclusive. The data items in a group of data items are all "disjoint" if they are pairwise disjoint. For example, if each data item of a group indicates an attribute of a respective analysis region of an image and if the respective analysis regions do not overlap then the data items are all disjoint.

A "power-of-two offset" within an array that defines a dimensioned body of data is an offset that spans one of the integral exponential powers of two, e.g. $2^0 = 1$, $2^1 = 2$, $2^2 = 4$, etc.

An operation "encodes" data items when performing the operation on the data items produces different data from which the encoded data items can subsequently be recovered.

An "image input device" is a device that can receive an image and provide a signal defining a version of the image. A "scanner" is an image input device that receives an image by a scanning operation, such as by scanning a document. A "user input device" is a device such as a keyboard or a mouse that can provide signals based on actions of a user. The data from the user input device may be a "request" for an operation, in which case the system may perform the requested operation in response. An "image output device" is a device that can provide an image as output. A "display is an image output device that provides information in visual form, such as on the screen of a cathode ray tube.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

An "edge" occurs in an image when two neighboring pixels have different pixel values. The term "edge pixel" may be applied to one or both of the two neighboring pixels.

A "border" of a polygonal region, such as a rectangle, is the line of pixels at the perimeter of the region along one of its sides. A "boundary" of a region is a perimeter, defined by the portions of the boundaries of its pixels along which those pixels either have no neighboring pixels or have neighboring pixels that are not in the region. A connected component "crosses" a boundary of a region if the connected component includes a pair of neighboring pixels that are on opposite sides of the boundary, one being in the region and the other not being in the region.

B. General Features

Figure 2:
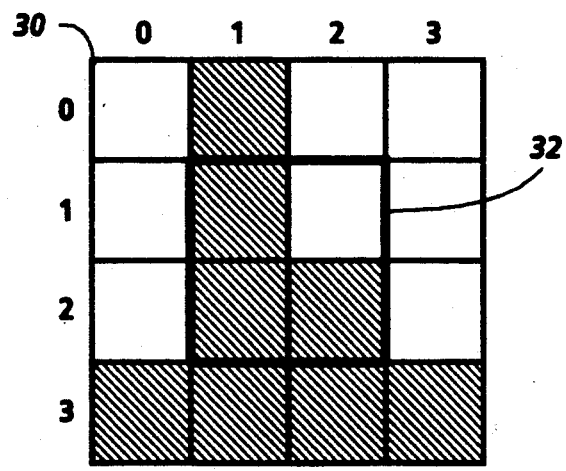
FIG. 2 is a simple image.
Figure 3:
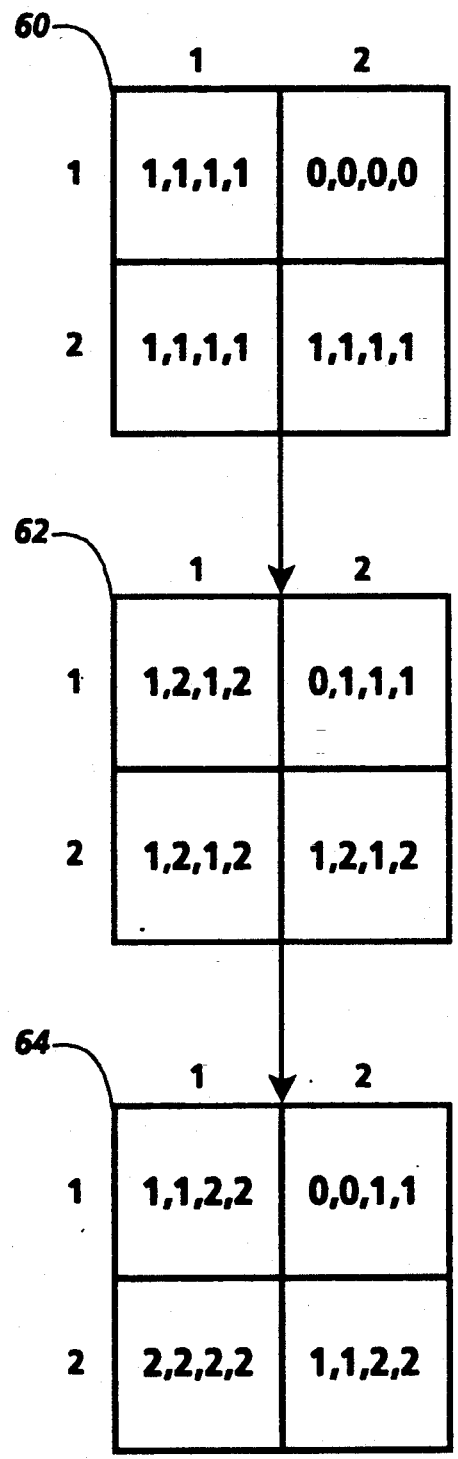
FIG. 3 illustrates a technique for hierarchically counting black border pixels of respective regions of increasing size.

FIGS. 1-5 illustrate general features of the invention. FIG. 1 shows, for each of several pixels in an image, a sequence of respective regions of increasing size. FIG. 2 is a simple image used for the examples in FIGS. 3-5. FIG. 3 illustrates a technique for hierarchically counting black border pixels of respective regions of increasing size. FIG. 4 illustrates a technique for hierarchically counting border edge pixels of respective regions of increasing size. FIG. 5 illustrates a technique for hierarchically determining connectedness of respective regions of increasing size.

FIG. 1 shows fragment 10 of a two-dimensional binary image, each of whose pixels can be designated as (m, n) using coordinates as shown. For each pixel, a sequence of respective regions of increasing size can be defined, within each of which the pixel occupies the same position, such as the upper left-hand corner. For pixel (M, N) in fragment 10, the respective regions include two-pixel region 12 and four-pixel region 14; for pixel (M+1, N), two-pixel region 16 and four-pixel region 18; for pixel (M+2, N), two-pixel region 20 and a four-pixel region (not shown); and so forth. Each pixel's respective two-pixel region includes the neighboring pixel below it in fragment 10, so that, for example, two-pixel region 12 includes the two neighboring pixels (M, N) and (M, N+1). Similarly, each pixel's respective four-pixel region includes its own respective two-pixel region and the respective two-pixel region of the neighboring pixel to its right in fragment 10, so that, for example, four-pixel region 14 includes the pixels in regions 12 and 16, including pixels (M, N), (M, N+1), (M+1, N), and (M+1, N+1).

FIG. 2 shows binary image 30, a simple image in which black pixels are shown shaded. Binary image 30 can be used to illustrate several techniques by which attributes of regions can be determined with local hierarchical operations. Boundary 32 surrounds four pixels, (1, 1), (1, 2), (2, 1), and (2, 2), to which FIGS. 3–5 relate.

Each of FIGS. 3–5 shows a sequence of three data item arrays, each array including a respective data item for each of these pixels. The first array in each sequence shows starting data items upon which a processor can operate to produce the other arrays. The starting data items each indicate border attribute values for the respective pixel. The data items of the second array in each sequence indicate border attribute values for the pixel's respective two-pixel region, and the data items of the third array indicate border attribute values for the pixel's respective four-pixel region.

The techniques in FIGS. 3–5 have the following general features: Each value in an array is produced by operating on two values, one a previously obtained value for the same pixel and the other a previously obtained value for another pixel. The techniques described in the architecture application can therefore be applied, with a power-of-two offset between the pixels whose results are operated on to produce each value. Also, the operation performed on the two values is generally an operation that combines the values, as defined above. Finally, the sequence of steps in each technique produces a hierarchy of data items, each indicating an attribute of a respective region of image 30.

Each data item in FIGS. 3–5 includes four values, each value indicating, for the respective region, an attribute of a border or boundary of the region. The values indicate attributes of the top, right, bottom, and left borders or boundaries, respectively.

In array 60 in FIG. 3, the starting data item for each black pixel includes the values (1, 1, 1, 1) and for each white pixel the values (0, 0, 0, 0). Array 62 shows, for each pixel, the black border pixel count for its respective two-pixel region. The top and bottom values are produced by selecting the appropriate top value or bottom value, respectively, from the starting data items in array 60, while the right and left values are produced by adding the right values and the left values, respectively. For example, the respective two-pixel region for pixel (1, 1) has the values (1, 2, 1, 2). Array 64 shows, for each pixel, the black border pixel count for its respective four-pixel region. In this case, the top and bottom values are produced by adding the top values and the bottom values, respectively, from the data items in array 62, while the right and left values are produced by selecting the appropriate right value or left value, respectively. For example, the respective four-pixel region for pixel (1, 1) has the values (1, 1, 2, 2).

In array 70 in FIG. 4, the starting data item for each black pixel includes four values indicating which of its neighboring pixels are white pixels, so that each value indicates whether there is an edge at the respective border. The starting data item for each white pixel has the values (0, 0, 0, 0) because a white pixel is treated as having no edges. Array 72 shows, for each pixel, the border edge counts for its respective two-pixel region, with the values being produced as in FIG. 3. For example, the respective two-pixel region for pixel (1, 1) has the border edge counts (0, 1, 0, 2). Array 74 shows, for each pixel, the border edge counts for its respective four-pixel region, again produced as in FIG. 3.

In array 80 in FIG. 5, the starting data item for each black pixel includes four boolean values indicating whether it is connected to a neighboring black pixel across the respective border. The starting data item for each white pixel has the values (0, 0, 0, 0). Array 82 shows, for each pixel, the borders across which its respective two-pixel region has a connection. The top and bottom values are produced by selecting the appropriate top value or bottom value, respectively, while the right and left values are produced by ORing the right values and left values, respectively. Array 84 shows, for each pixel, the boundaries across with its respective four-pixel region has a connection. The top and bottom values are produced by ORing the top values and bottom values, respectively, while the right and left values are produced by selecting the appropriate right value or left value, respectively.

As discussed in the architecture application, exhaustive hierarchical operations like those described above can be performed with an in-place implementation on a parallel processor like the Connection Machine from Thinking Machines Corporation.

C. An Implementation

The invention has been implemented on a Connection Machine from Thinking Machines Corporation, using the in-place implementation techniques described in the architecture application to produce exhaustive hierarchies of data items:

1. Image Chunking

The implementation provides image analysis based on simple local analysis regions called chunks. Chunks are defined across a wide range of scales for a given image size, and chunks at each scale are positioned so that they overlap densely. The chunks at a given scale may include one chunk at every possible position within the image, providing an exhaustive set of chunks.

Figure 6:
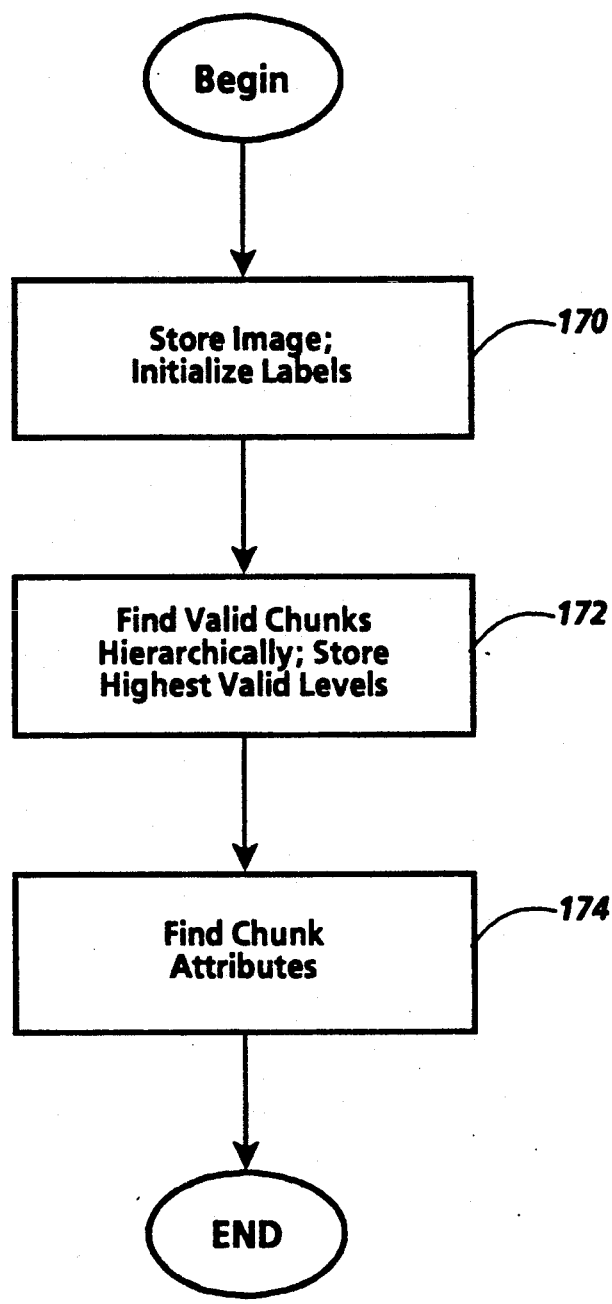
FIG. 6 shows general steps in an image analysis operation based on chunking.

FIG. 6 shows general steps in an image analysis operation based on chunking. The step in box 170 stores an image to be analyzed, with each processing unit's local memory containing the respective pixel's value. Label bits in each processing unit's local memory are initialized. The step in box 172 finds chunks that meet a validity criterion by producing an exhaustive hierarchy of data items. The data items can optionally be encoded by storing the highest valid level at each processing unit. The step in box 174 finds one or more attributes of valid chunks.

2. Finding Valid Chunks

For every location in the image in parallel, a hierarchical process can classify corresponding rectangular regions at a series of scales as (i) containing no black connected components; (ii) containing a single connected component; or (iii) possibly containing more than one connected component. Under thick chunk validity criterion, a region known to contain a single connected component is referred to as valid. A region with no connected component is referred to as vacant. A region possibly containing more than one connected component is referred to as invalid. A valid region with no holes (no white components) is referred to as full. Vacancy, validity, and fullness can be established hierarchically based on the following five rules:

1. A white pixel is vacant and a black pixel is initially both valid and full.
2. The union of two adjacent vacant regions is vacant.
3. The union of two adjacent full regions is full.
4. The union of an adjacent vacant region and valid region is valid.
5. The union of two adjacent valid regions is valid if the components in the two subregions are connected.

Note that under these classification rules, some regions containing a single connected component may be labeled invalid. This uncertainty in the classification arises because the classification process is local, whereas connectivity is a global relation.

Whether or not the components in two adjacent regions are connected can in turn be expressed locally and hierarchically. The condition is met if any black pixel in one region is adjacent to a black pixel in the other region. For example, four-adjacency can be the criterion for adjacency of black pixels. A region with a black pixel in its right border that is adjacent to a black pixel outside the region is referred to as right-connected. A region with a black pixel in its bottom border that is adjacent to a black pixel outside the region is referred to as down-connected. Right-connectedness and down-connectedness can be established hierarchically based on the following rules:

1. A black pixel is right-connected if the neighboring pixel with offsets (1, 0) is also black. A black pixel is down-connected if the neighboring pixel with offsets (0, 1) is also black.
2. At odd levels:
   (a) A region is right-connected if either of its children is right-connected.
   (b) A region is down-connected if its bottom child is down-connected.
3. At even levels:
   (a) A region is right-connected if its right child is right-connected.
   (b) A region is down-connected if either of its children is down-connected.

These rules lend themselves to exhaustive hierarchical operations like those described in the architecture application. To process a square image of width N in a grid of the same width, each processing unit can produce the data items at all levels for a respective pixel. Let l=0 at the base level of the hierarchy, with top level h=2 log N+1. The computation is applied to rectangular regions ranging in size from one pixel to the entire image. A processing unit at the current level l of the computation is denoted by P, and the region for which P produces a data item is denoted by R, with subregions r1 and r2 as described in copending, coassigned U.S. patent application Ser. No. 07/535,435. The processing unit at level l−1 that produced a data item for subregion r2 of R is denoted by P2. P itself produced a data item for subregion r1 of R at level l−1. At each step, communication between processing units is implemented by shifting the array. The offsets of P2 from P $(x_{o2}, y_{o2})$ are $(0, 2^{(l-1)/2})$ at odd levels and $(2^{l/2-1}, 0)$ at even levels.

Figure 7:
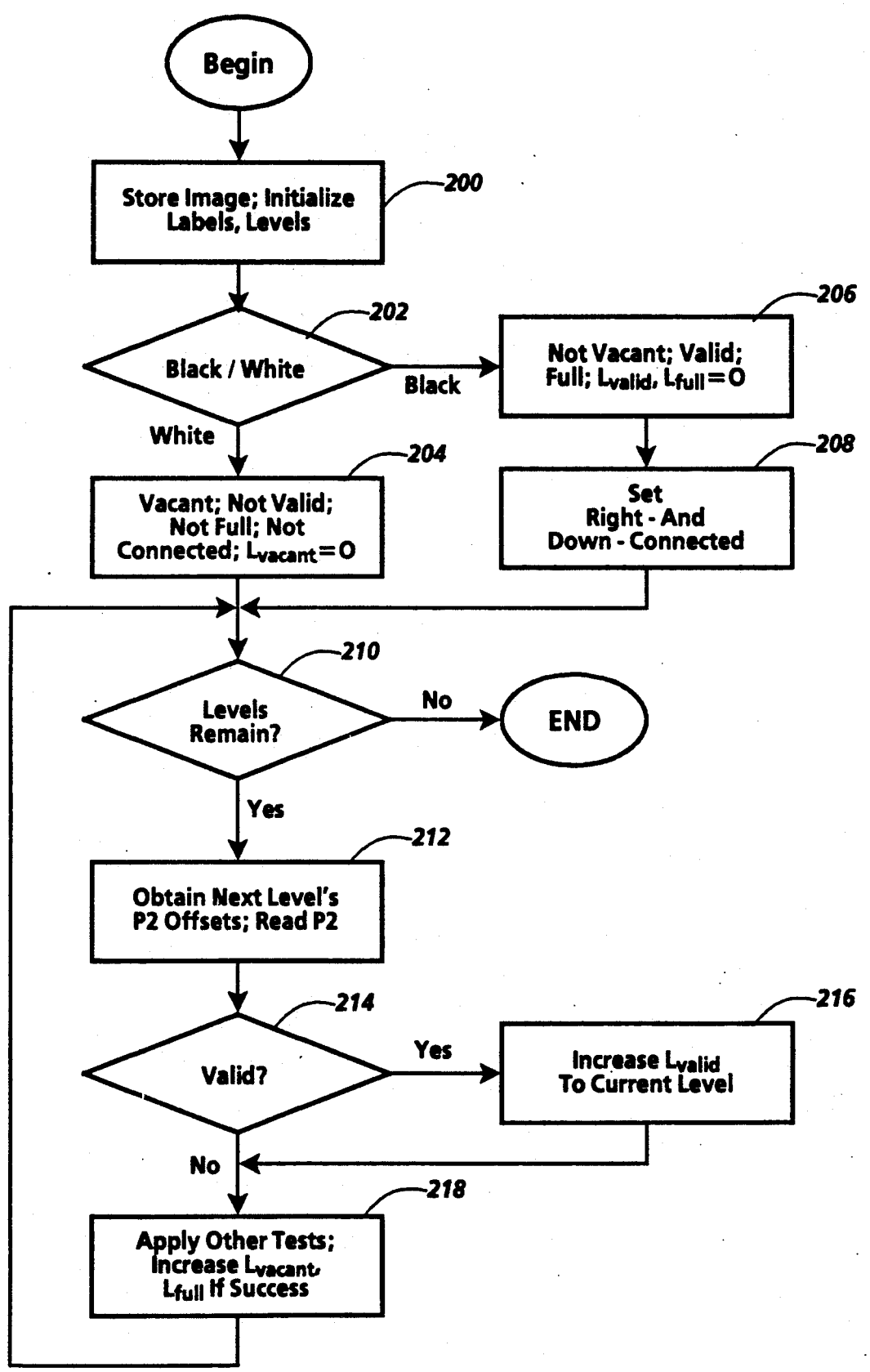
FIG. 7 illustrates an operation which finds, for every pixel at all hierarchical levels, the results of the various tests for the respective regions and encodes the results.

The operation in FIG. 7 finds, for every pixel at all hierarchical levels, the results of the valid, vacant, and full tests for the respective region. In addition, it encodes the results by recording the maximum level at which each test succeeds.

The step in box 200 begins by storing the image and initializing label bits and level fields for each processing unit. Label bits can include bits for the results of the valid, vacant, full, right-connected, and down-connected tests. Level fields can include $L_{valid}$, $L_{vacant}$, and $L_{full}$.

The step in box 202 branches at each processing unit based on whether its pixel is white or black, to produce the appropriate data for the lowest level of the hierarchy. If white, the step in box 204 sets the vacant label to "on", sets the other labels to "off," and changes $L_{vacant}$ to zero. If black, the step in box 206 sets the valid and full labels to "on," sets the vacant label to "off," and changes $L_{valid}$ and $L_{full}$ to zero. The step in box 208 shifts the pixel values to provide data so that each processing unit can determine whether it has a black pixel that is right- or down-connected, with each label being set accordingly.

The step in box 210 then begins an iterative loop that produces each of the higher levels of the hierarchy. To begin, the step in box 212 obtains the level's offsets to P2, which are used by each processing unit to read the labels in its P2. The, in box 214, each processing unit applies the validity criterion, saving the result in its valid label. The step in box 216 increases $L_{valid}$ to the current level if the criterion was met. The step in box 218 applies the other tests, saving the results in the labels and increasing $L_{vacant}$ and $L_{full}$ if successful with the respective tests.

The operation in FIG. 7 produces a complete encoding of the results across scales from which it is easy to later recover results at any given scale. Specifically, suppose $L_{valid}$, $L_{vacant}$, and $L_{full}$ are the maximum valid, vacant, and full levels at a processing unit P. Suppose the null value for these measures is −1; that is, $L_{valid}=-1$ at P if P does not find a valid region at any scale. Then, P would be labeled valid at level l if (i) $l > L_{vacant}$; and (ii) $l \leq L_{valid}$. P would be labeled vacant at level l if $l \leq L_{vacant}$. P would be labeled full at level l if $l \leq L_{full}$.

3. Topological Class

A region containing a single connected black component can be classified according to a characterization of the local topology. One possible characterization is the number of white components, referred to as holes, in the region. A related characterization is the number of intersections of the component with the region border, termed the exit count. The exit count, when positive, is equal to the number of holes in the region if the component itself contains no holes. The number of holes in a single component region could also be obtained based on the Euler number, which, like the exit count, can be established by hierarchical counting.

The exit count is half the border edge count, the number of border edges in the region, when the region is not full; the exit count is 1 for a full region. A border edge is the edge between a black pixel and a white pixel that are adjacent and are both in the border of the region. The border edge count is always even.

Figure 8:
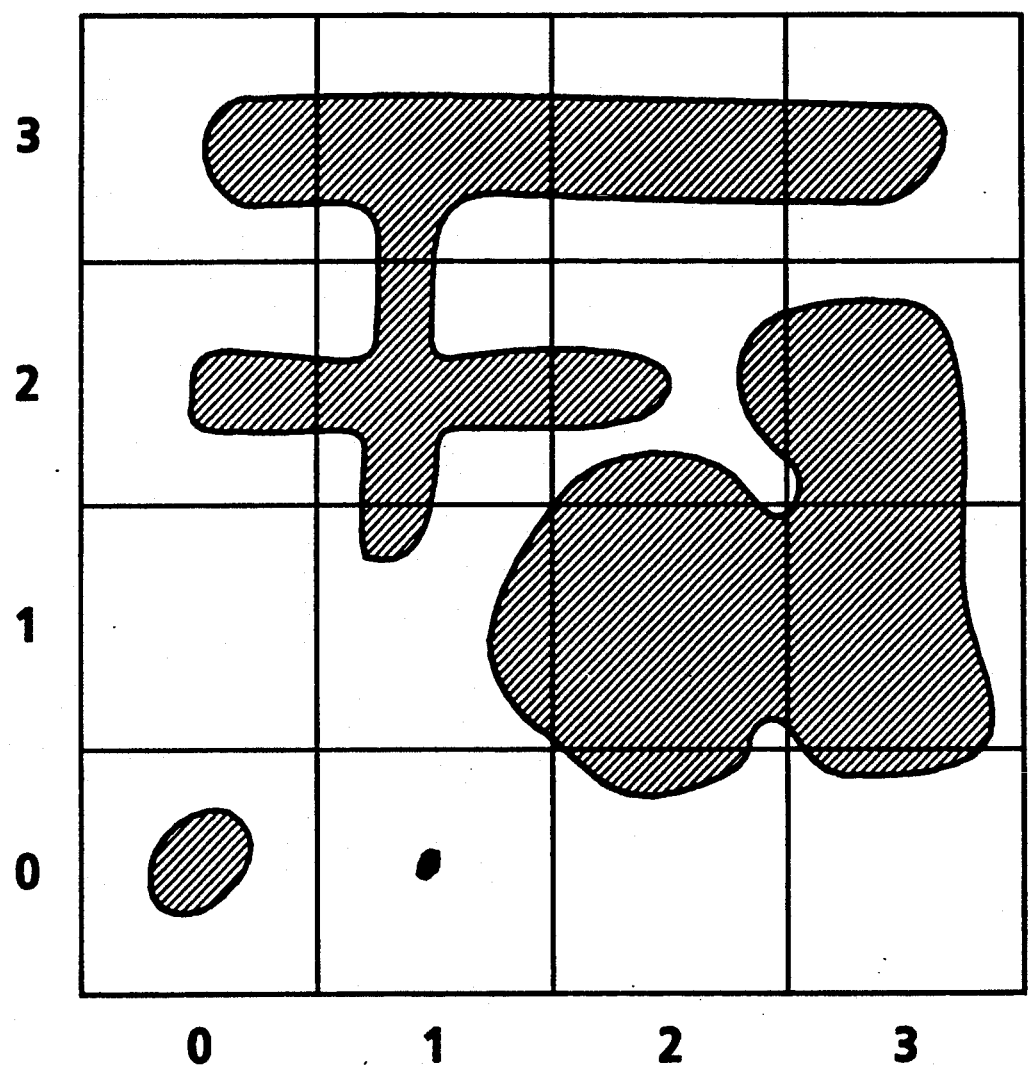
FIG. 8 shows regions with various illustrative topologies.

FIG. 8 shows regions with various illustrative topologies. The region at (0,1), for example is vacant. Of the valid regions, those at (0, 0) and (1, 0) have border edge counts of zero; those at (0, 2), (0, 3), (2, 0), (3, 0), and (3, 3) have value two; those at (2, 3) and (3, 2) have value four; those at (1, 3) and (3, 1) have value six; and those at (1, 2) and (2, 1) have value eight. The regions at (1, 1) and (2, 2) are invalid.

Because of the hierarchical way in which single component regions are defined, meaningful regions with exit count greater than two seldom arise in practice. Therefore, it is sufficient to classify a valid region according to exit count only if its exit count is less than or equal to an upper limit of two, leaving other regions unclassified, or classified as too complicated.

The border edge count $E_b$ for a region may be obtained by combining partial counts for the left, right, top, and bottom borders of its subregions taking care to introduce border edges where adjacent corner pixels of the subregions have different colors. Left, right, top, and bottom partial counts are denoted by l, r, t, and b, respectively. The values of the top-left, top-right, bottom-left, and bottom-right corner pixels are denoted by tl, tr, bl, and br, respectively.

At the lowest level of the hierarchy, the partial counts all are 0; the corner values all are 1 for a black pixel and 0 for a white pixel.

At odd levels, $$t_p = t_{ct}$$
$$b_p = b_{cb}$$
$$l_p = l_{ct} + l_{cb} + \delta_l$$
$$r_p = r_{ct} + r_{cb} + \delta_r$$
$$tl_p = tl_{ct}$$
$$tr_p = tr_{ct}$$
$$bl_p = bl_{cb}$$
$$br_p = \& br_{cb},$$

where
$$\delta_l = \{0 \text{ if } bl_{ct} = tl_{cb}$$
$$\{1 \text{ otherwise,}$$

and
$$\delta_r = \{0 \text{ if } br_{ct} = tr_{cb}$$
$$\{1 \text{ otherwise.}$$

At even levels,
$$l_p = l_{cl}$$
$$r_p = r_{cr}$$
$$t_p = t_{cl} + t_{cr} + \delta_t$$
$$b_p = b_{cl} + b_{cr} + \delta_b$$
$$tl_p = tl_{cl}$$
$$tr_p = tr_{cr}$$
$$bl_p = bl_{cl}$$
$$br_p = br_{cr}$$

where
$$\delta_t = \{0 \text{ if } tr_{cl} = tl_{cr}$$
$$\{1 \text{ otherwise,}$$

and
$$\delta_b = \{0 \; br_{cl} = bl_{cr}$$
$$\{1 \text{ otherwise.}$$

At any level, $E_b = t + r + b + l$.

Figure 9:
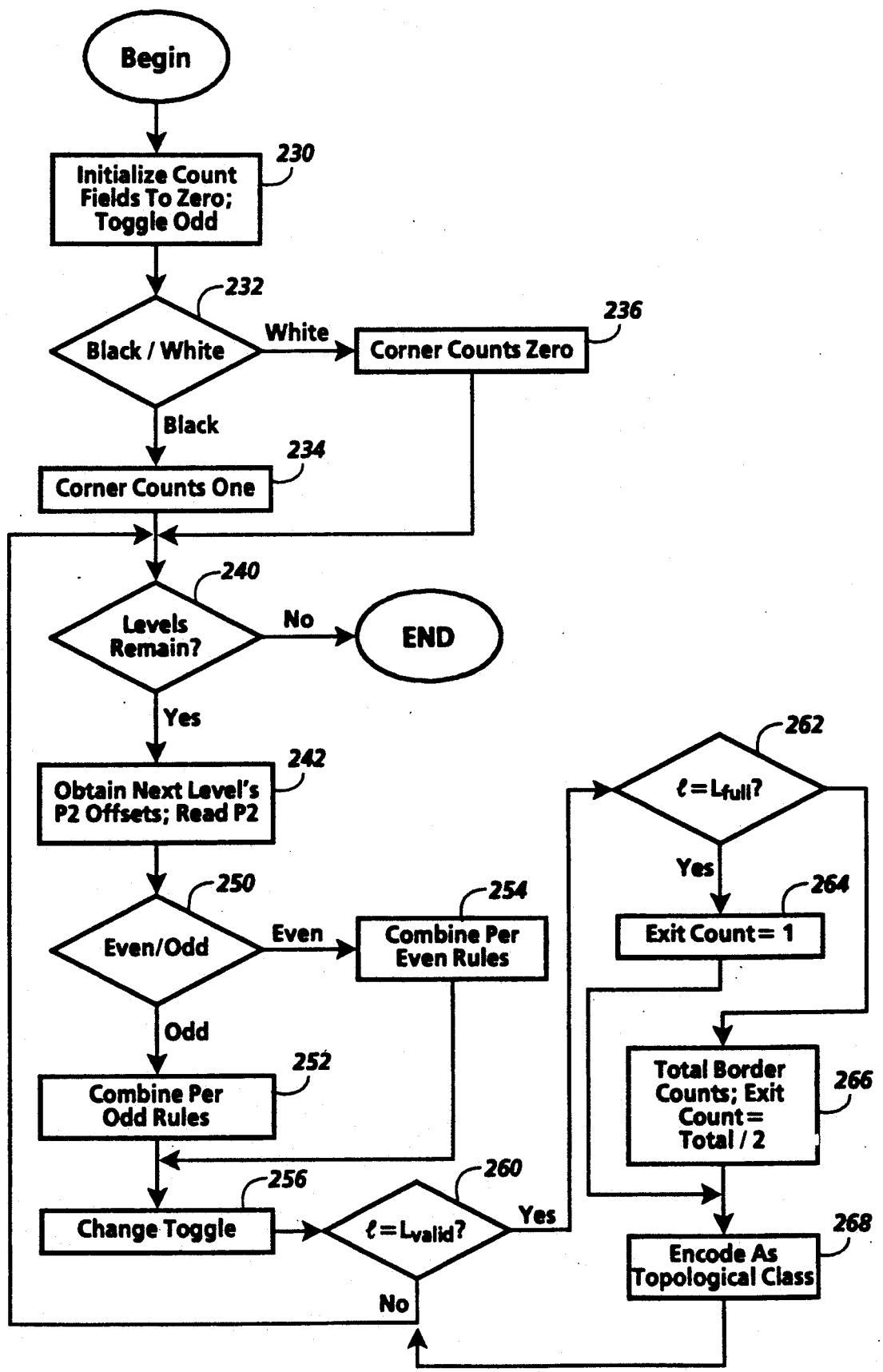
FIG. 9 shows steps in obtaining the exit count of each valid region.

FIG. 9 shows steps in obtaining the exit count of each valid region. The step in box 230 begins by initializing a set of partial border edge count fields, corner count fields, and exit count fields at each processing unit to zero and by setting a toggle bit to indicate an odd level.

The step in box 232 branches based on whether the processing unit's pixel is black or white. If black, the step in box 234 sets the corner count fields to one. If white, the step in box 236 sets the corner count fields to zero.

The step in box 240 then begins an iterative loop that produces partial border edge counts and corner counts for each level of the hierarchy. The step in box 242 obtains the next level's offsets to P2 and uses them to read the counts from P2. Then, the step in box 250 branches based on whether the toggle is currently even or odd. If odd, the step in box 252 combines the counts from the next lower level according to the odd level rules above. If even, the step in box 254 combines the counts from the next lower level according to the even level rules above. Then the step in box 256 changes the toggle so that the next iteration will apply the other set of rules.

The step in box 260 then branches based on whether the current level is the level indicated by $L_{valid}$. If so, the step in box 262 also branches based on whether the current level is the level indicated by $L_{full}$. The step in box 264 sets the exit count to one if the current level is the maximum valid and full level. Otherwise, the step in box 266 totals the partial border counts and sets the exit count to one-half the total.

The step in box 268 can optionally encode the exit count by saving only a topological class. For example, 0-exit, non-full regions can be encoded as class 3; 2-exit regions as class 2; 1-exit regions as class 1; and other regions can be treated as invalid. Essentially, this encoding defines membership in a given class at some scale to supercede membership in any lower-valued class at some other scale. It is designed to support maximum-value propagation, discussed in the architecture application in relation to propagation.

4. Local Extent

The local extent of the component in a valid region can also be measured hierarchically. The most familiar measures of the extent of a geometric figure are area and perimeter. The local extent of a component can be defined as its area divided by its perimeter. A related measure, perimeter squared divided by area, has often been used in the computer vision literature as a measure of compactness. Local extent, as defined above, is a sort of measure of the width of the component, but the term width is used for another measure discussed in the architecture application. To see the connection of local extent to the intuitive notion of width, imagine a valid region traversed by a thick line. The long dimension of the component contributes most of the perimeter, so the result of dividing area by perimeter roughly accounts for the shorter dimension.

The area of the component in a valid region, or the pixel count, is the number of black pixels in the region. The pixel count of a region is the sum of the pixel counts of its two children. The pixel count is 0 for a white pixel and 1 for a black pixel.

The perimeter of the component in a valid region is the sum of the edge count and the border pixel count.

The edge count is the number of edge pixels in the region. An edge pixel is a black pixel that is adjacent to a white pixel. The edge count of a region is the sum of the edge counts of its two children. The edge count is 1 for an edge pixel and 0 for a non-edge pixel.

The border pixel count is the number of black pixels in the border of the region. The border of the region is the set of pixels in the region that have an adjacent pixel that is outside the region. The border pixel count $A_b$ for a region is computed by combining the partial counts for the left, right, top, and bottom borders of its child regions, taking care not to double count corner pixels.

The left, right, top, and bottom border pixel counts for a given region are denoted by l, r, t, and b, respectively. The values of the top-left, top-right, bottom-left and bottom-right corner pixels of the region are denoted by tl, tr, bl, and br, respectively. These symbols will be modified with the subscripts p, c1, and c2 to denote the corresponding value for the parent region, first child, or second child, respectively, and by the subscripts cl, cr, ct, or cb to denote the value for the left, right, top, or bottom child, respectively.

At the lowest level of the hierarchy, the region is a single pixel, and the partial border-pixel counts and the corner values all are 1 for a black pixel and 0 for a white pixel.

At odd levels,
$$t_p = t_{ct}$$
$$b_p = b_{cb}$$
$$l_p = l_{ct} + l_{cb}$$
$$r_p = r_{ct} + r_{cb}$$
$$tl_p = tl_{ct}$$
$$tr_p = tr_{ct}$$
$$bl_p = bl_{cb}$$
$$br_p = br_{cb}$$

At even levels,
$$l_p = l_{cl}$$
$$r_p = r_{cr}$$
$$t_p = t_{cl} + t_{cr}$$
$$b_p = b_{cl} + b_{cr}$$
$$tl_p = tl_{cl}$$
$$tr_p = tr_{cr}$$
$$bl_p = bl_{cl}$$
$$br_p = br_{cr}$$

At any level, $A_b = t + r + b + l - tl - tr - bl - br$.

Figure 10:
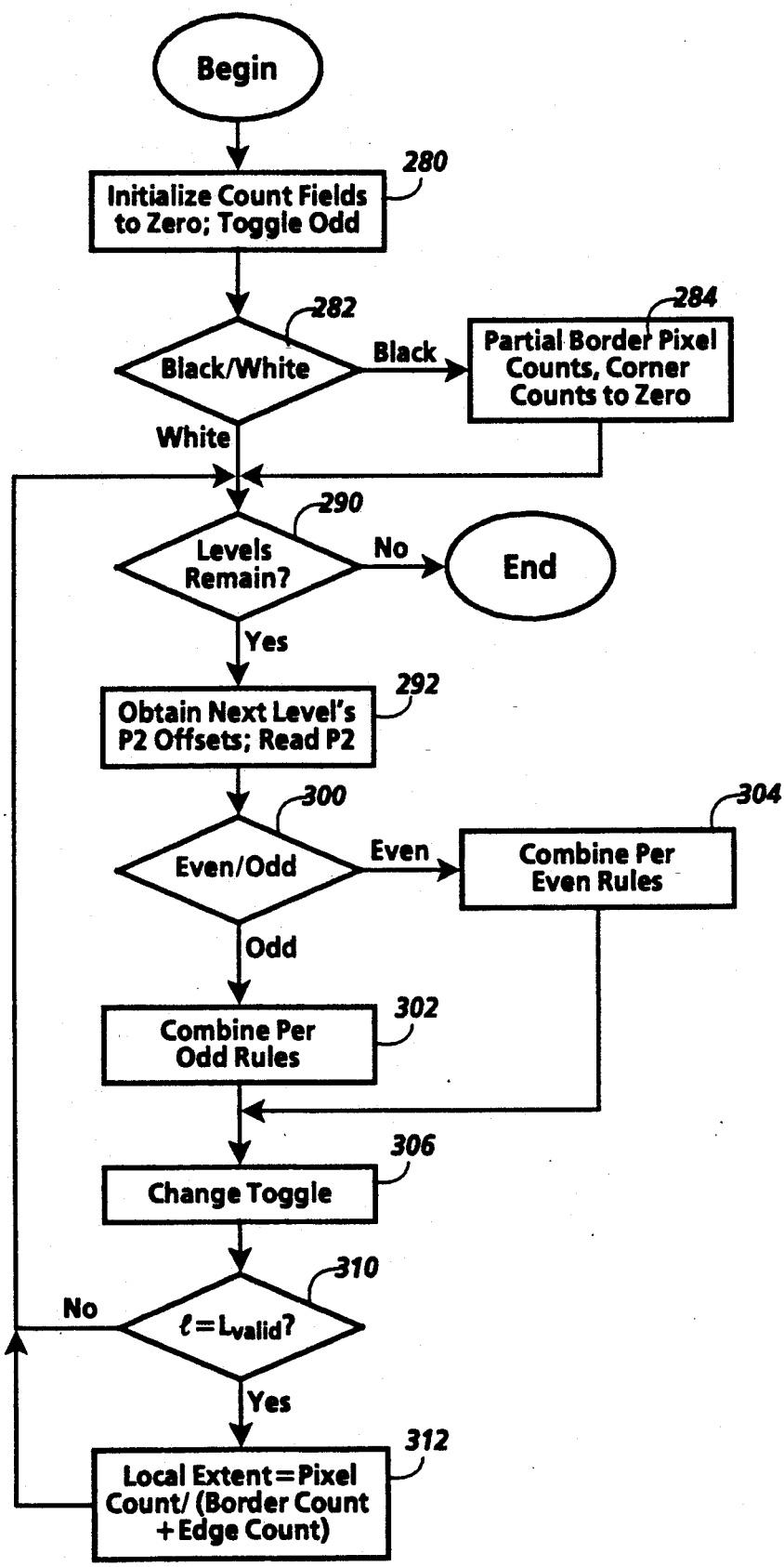
FIG. 10 shows steps in obtaining a measure of local extent of each valid region.

FIG. 10 shows steps in obtaining a measure of local extent of each valid region. The step in box 280 begins by initializing a set of partial border pixel count fields, corner count fields, edge count fields, and pixel count fields at each processing unit to zero and by setting a toggle bit to indicate an odd level.

The step in box 282 branches based on whether the processing unit's pixel is black or white. If black, the step in box 284 sets the partial border pixel count fields and the corner count fields to one.

The step in box 290 then begins an iterative loop that produces partial border pixel counts, corner counts, edge counts, and pixel counts for each level of the hierarchy. The step in box 292 obtains the next level's offsets to P2 and uses them to read the counts from P2.

Then, the step in box 300 branches based on whether the toggle is currently even or odd. If odd, the step in box 302 combines the counts from the next lower level according to the odd level rules above. If even, the step in box 304 combines the counts from the next lower level according to the even level rules above. Then the step in box 306 changes the toggle so that the next iteration will apply the other set of rules.

The step in box 310 then branches based on whether the current level is the level indicated by $L_{valid}$. If so, the step in box 312 obtains the level extent by dividing the pixel count by the sum of the border pixel and edge counts.

D. Source Code Appendix

Appendix A is source code for implementing some of the features described above. The source code in Appendix A may differ in some respects from the above description, but execution of the source code in Appendix A on a Connection Machine provides substantially all the features described above. In some cases, the code has been optimized or includes additional features. Source code for implementing other features is included in copending coassigned U.S. patent application Ser. No. 07/535,438, entitled "Exhaustive Hierarchical Near Neighbor Operations on an Image" and Ser. No. 07/535,796, entitled "Dense Aggregative Hierarchical Techniques for Data Analysis," both filed on Jun. 8, 1990 and both of which are incorporated herein by reference in their entirety.

The following are included in Appendix A:

The function LABEL-VALID-SCALE establishes maximal single component regions.

The function LABEL-EXTENT combines border pixel counts, edge counts, and pixel counts to obtain a measure of local extent.

The function LABEL-TYPE uses border edge counts to obtain a topological class.

E. Miscellaneous

The invention has been described in terms of operation on binary images, but could be applied to images of all types and, more generally, to bodies of data that map into arrays similar to those described.

The implementation described above divides an image into regions that each contain up to one connected component. The invention could also be implemented for regions that contain up to two or some higher number of connected components.

Although the invention has been described in relation to various implementations, together with modifications, variations and extensions thereof, other implementations, modifications, variations and extensions are within the scope of the invention. The invention is therefore not limited to the description contained herein or by the drawings, but only by the claims.

APPENDIX A

```
;;;-*- Syntax: Common-lisp; mode: lisp; package: REVERSE-GRAPHICS; base: 10 -*-
;;;
;;; This file contains chunking and labeling operations.
;;;

;; For all operations in this file, the arguments bitmap and
;; max-valid-level are pvars. bitmap is a 1-bit field pvar.
```

```
;; max-valid-level is a field with enough bits to hold (1+
;; top-chunking-level), which is by convention the null value.

;; The top-level operations in this file are all named with the prefix
;; LABEL-. Usually they take two arguments---the input bitmap, and
;; result pvar. The caller is responsible for allocating these pvars
;; appropriately. There are some utilities are the very end of the file
;; for doing this allocation, but they are not central to this
;; file---allocation may be done in any manner appropriate to the
;; application.

;; Most of the top-level LABEL-XXX operations in this file (except for
;; the ones on the next page) are self-contained chunk-measure-and-label
;; processes. They involve
;; computing maximal valid regions, computing some measures on their
;; contents, and then propagating the results to pixels across each
;; regions.

;; The operations in this file are in-place implementations of the
;; chunking and labeling processes. They were, however, derived from
;; independent-storage implementations in such a way that getting back
;; to a working independent-storage version should be easy. The
;; conversion to the in-place form was done by commenting out lines of
;; code that involve only the first child, since these computations are
;; redundant in the in-place case. (Also, the child-ref!! macro was
;; modified so that for the first child it simply expands to its
;; argument pvar.)

;;;------------------------------------------------------------------
;;; maximal valid regions (defun LABEL-VALID-SCALE-1
    (bitmap max-valid-level
     &optional (start-level base-chunking-level)
     &aux (nullv (1+ top-chunking-level)))
  (*locally
    (declare (type (field-pvar 1) bitmap)
        (type (field-pvar (pvar-length max-valid-level)) max-valid-level))
    (*let (rexit?? dexit?? vacant?? valid??)
      (declare (type (field-pvar 1) rexit?? dexit?? vacant?? valid??))
      (*set rexit?? (connections!! bitmap :right))
      (*set dexit?? (connections!! bitmap :down))
      (*set vacant?? (not01!! bitmap))
      (*set valid?? (if!! (=!! max-valid-level (!!f nullv)) (!! 0) bitmap))
      (loop for l from 1 to top-chunking-level do
        (*set valid??
          (or01!!
            (and01!! (child-ref!! valid?? 1 l) (child-ref!! vacant?? 2 l))
            (and01!! (child-ref!! vacant?? 1 l) (child-ref!! valid?? 2 l))
            (and01!! (child-ref!! valid?? 1 l) (child-ref!! valid?? 2 l)
              (child-ref!! (fpvl (if (oddp l) dexit?? rexit??)) 1 1 l))))
        (*when (plusp!! valid??) (*set max-valid-level (!!f l)))
        (when (oddp l)
```

```
        (if (< = l start-level)
          (*set rexit?? (and01!! valid?? (child-ref!! valid?? 2 (1+ l)))
             dexit?? (and01!! valid?? (child-ref!! valid?? 2 (+ l 2))) )
          (*set rexit?? (or01!! (child-ref!! rexit?? 1 l) (child-ref!! rexit?? 2 l))
             dexit?? (child-ref!! dexit?? 2 l))))
       (when (evenp l)
         (if (< = l start-level)
           (*set dexit?? (and01!! valid?? (child-ref!! valid?? 2 (1+ l)))
              rexit?? (and01!! valid?? (child-ref!! valid?? 2 (+ l 2))) )
           (*set dexit?? (or01!! (child-ref!! dexit?? 1 l) (child-ref!! dexit?? 2 l))
              rexit?? (child-ref!! rexit?? 2 l))))
       (*set vacant?? (and01!! (child-ref!! vacant?? 1 l) (child-ref!! vacant?? 2 l)))))))

;; assumes max-valid-level already initialized appropriately.
(defun LABEL-VALID-SCALE
    (bitmap max-valid-level   &optional (start-level base-chunking-level)
    &aux (nullv (1+ top-chunking-level)))
  (*locally
   (declare (type (field-pvar 1) bitmap)
       (type (field-pvar (pvar-length max-valid-level)) max-valid-level))
   (*set max-valid-level (if!! (plusp!! bitmap) (!! 0) (!!f nullv)))
   (label-valid-scale-1 bitmap max-valid-level start-level)))

(defun LABEL-VACANT-SCALE
    (bitmap max-vacant-level
    &aux (nullv (1+ top-chunking-level)))
  (*locally
   (declare (type (field-pvar 1) bitmap)
       (type (field-pvar (pvar-length max-vacant-level)) max-vacant-level))
   (*let (vacant??)
     (declare (type (field-pvar 1) vacant??))
     (*set vacant?? (not01!! bitmap))
     (*set max-vacant-level (if!! (plusp!! vacant??) (!! 0) (!!f nullv)))
     (loop for l from 1 to top-chunking-level do
       (*set vacant?? (and01!! (child-ref!! vacant?? 1 l) (child-ref!! vacant?? 2 l)))
       (*when (plusp!! vacant??)(*set max-vacant-level (!!f l)))))))

(defun LABEL-FULL-SCALE
    (bitmap max-full-level
    &aux (nullv (1+ top-chunking-level)))
  (*locally
   (declare (type (field-pvar 1) bitmap)
       (type (field-pvar (pvar-length max-full-level)) max-full-level))
   (*let (full??)
     (declare (type (field-pvar 1) full??))
     (*set full?? bitmap)
     (*set max-full-level (if!! (plusp!! full??) (!! 0) (!!f nullv)))
     (loop for l from 1 to top-chunking-level do
       (*set full?? (and01!! (child-ref!! full?? 1 l) (child-ref!! full?? 2 l)))
       (*when (plusp!! full??) (*set max-full-level (!!f l)))))))
```

;;;----------------------------------------------------------------
;;; border-pixel-count

```
;; This function computes the border-pixel-count.
;; sum is a field pvar with enough bits to hold the
;; largest possible result (i.e., the perimeter of the image.)

;; In this and other hierarchical operations below, some lines of code
;; are commented out. These are computations involving the first child
;; only; they are redundant in an in-place implementation.

(*defun SUM-BORDER-PIXELS (bitmap max-valid-level sum)
  (declare (type (field-pvar 1) bitmap)
      (type (field-pvar (pvar-length sum)) sum)
      (type (field-pvar (pvar-length max-valid-level)) max-valid-level))
   (*let (top bot left right top-left bot-left top-right bot-right)
     (declare (type (field-pvar 16) top left bot right)
         (type (field-pvar 1) top-left bot-left bot-right top-right))
      (*set sum bitmap top bitmap left bitmap bot bitmap right bitmap
         top-left bitmap bot-left bitmap bot-right bitmap top-right bitmap)
      (loop for l from 1 to top-chunking-level do
        (when (oddp l)
;         (*set top (child-ref!! top 1 l))
          (*set bot (child-ref!! bot 2 l))
          (*set left (+!! (child-ref!! left 1 l) (child-ref!! left 2 l)))
          (*set right (+!! (child-ref!! right 1 l) (child-ref!! right 2 l)))
;         (*set top-left (child-ref!! top-left 1 l))
;         (*set top-right (child-ref!! top-right 1 l))
          (*set bot-left (child-ref!! bot-left 2 l))
          (*set bot-right (child-ref!! bot-right 2 l)))
        (when (evenp l)
;         (*set left (child-ref!! left 1 l))
          (*set right (child-ref!! right 2 l))
          (*set top (+!! (child-ref!! top 1 l) (child-ref!! top 2 l)))
          (*set bot (+!! (child-ref!! bot 1 l) (child-ref!! bot 2 l)))
;         (*set top-left (child-ref!! top-left 1 l))
          (*set top-right (child-ref!! top-right 2 l))
;         (*set bot-left (child-ref!! bot-left 1 l))
          (*set bot-right (child-ref!! bot-right 2 l)))
        (*when (valid-level?? l max-valid-level)
          (*set sum (-!! (+!! left right top bot)
              (+!! top-left bot-left top-right bot-right)))))))

;;;----------------------------------------------------------------
;;; pixel-count, edge-count, and local extent ;; These functions are utilities used in the remainder of this file for
;; summing a value over maximal valid regions.

(*defun sum-max-valid-regions (sum max-valid-level)
  (declare (type (field-pvar (pvar-length sum)) sum))
  (loop for l from 1 to top-chunking-level do
    (*when (valid-level?? l max-valid-level)
      (*set sum (+!! (child-ref!! sum 1 l) (child-ref!! sum 2 l))))))

(*defun sum-max-valid-regions-list (sum-list max-valid-level)
  (loop for sum in sum-list do
    (sum-max-valid-regions sum max-valid-level)))
```

```
;; This function computes the pixel-count.

(defun SUM-PIXELS (bitmap max-valid-level pixels)
  (*locally
    (declare (type (field-pvar 1) bitmap)
      (type (field-pvar (pvar-length pixels)) pixels))
    (*set pixels (!! 0) pixels bitmap)
    (sum-max-valid-regions pixels max-valid-level)))

;; This function computes the edge-count.

(defun SUM-EDGES (bitmap max-valid-level edges)
  (*locally
    (declare (type (field-pvar 1) bitmap)
      (type (field-pvar (pvar-length edges)) edges))
    (*set edges (!! 0) edges (edge-pixels!! bitmap))
    (sum-max-valid-regions edges max-valid-level)))

;; This function computes the local extent.

(*defun get-extent (pixels edges border-pixels extent)
  (declare (type (field-pvar (pvar-length pixels)) pixels)
    (type (field-pvar (pvar-length edges)) edges)
    (type (field-pvar (pvar-length border-pixels)) border-pixels)
    (type (field-pvar (pvar-length extent)) extent))
  (*set extent (!! 0))
  (*let ((perimeter (+!! edges border-pixels)))
    (declare (type (field-pvar 16) perimeter))
    (*when (plusp!! perimeter)
      (*set extent (round!! (*!! pixels (!!f 100.)) perimeter)))))

(defun LABEL-EXTENT (bitmap extent)
  (*let (pixels edges bsum max-valid-level)
    (declare (type (field-pvar 16) pixels edges bsum)
      (type (field-pvar 8) max-valid-level))
    (label-valid-scale bitmap max-valid-level)
    (sum-pixels bitmap max-valid-level pixels)
    (sum-edges bitmap max-valid-level edges)
    (sum-border-pixels bitmap max-valid-level bsum)
    (get-extent pixels edges bsum extent)
    (project-max-valid-value extent extent max-valid-level)))

;;;-----------------------------------------------------------
;;; border-edge-count ;; This function computes the border-edge-count.
;; sum is a field pvar with enough bits to hold the
;; largest possible result (i.e., roughly the perimeter of the image.)

;; This function is useful in an independent-storage implementation for
;; labeling topological class. It is not useful in an in-place
;; implementation. It is kept in this file for possible future use.
;; See next page.
```

```
(*defun SUM-BORDER-EDGES (bitmap max-valid-level sum)
  (declare (type (field-pvar 1) bitmap)
      (type (field-pvar (pvar-length sum)) sum)
      (type (field-pvar (pvar-length max-valid-level)) max-valid-le  ,,
  (*set sum (!! 1))              ;null value---odd sums impossible.
  (*let (top bot left right top-left bot-left top-right bot-right)
    (declare (type (field-pvar 16) top left bot right)
     (type (field-pvar 1) top-left bot-left bot-right top-right))
   (*set top (!! 0) left (!! 0) bot (!! 0) right (!! 0)
      top-left bitmap bot-left bitmap bot-right bitmap top-right bitmap)
   (loop for l from 1 to top-chunking-level do
     (when (oddp l)
;      (*set top (child-ref!! top 1 l))
       (*set bot (child-ref!! bot 2 l))
       (*set left (+!! (child-ref!! left 1 l) (child-ref!! left 2 l)
           (not=01!! (child-ref!! bot-left 1 l) (child-ref!! top-left 2 l))))
       (*set right (+!! (child-ref!! right 1 l) (child-ref!! right 2 l)
           (not=01!! (child-ref!! bot-right 1 l) (child-ref!! top-right 2 l))))
;      (*set top-left (child-ref!! top-left 1 l))
;      (*set top-right (child-ref!! top-right 1 l))
       (*set bot-left (child-ref!! bot-left 2 l))
       (*set bot-right (child-ref!! bot-right 2 l)))
     (when (evenp l)
;      (*set left (child-ref!! left 1 l))
       (*set right (child-ref!! right 2 l))
       (*set top (+!! (child-ref!! top 1 l) (child-ref!! top 2 l)
           (not=01!! (child-ref!! top-right 1 l) (child-ref!! top-left 2 l))))
       (*set bot (+!! (child-ref!! bot 1 l) (child-ref!! bot 2 l)
           (not=01!! (child-ref!! bot-right 1 l) (child-ref!! bot-left 2 l))))
;      (*set top-left (child-ref!! top-left 1 l))
       (*set top-right (child-ref!! top-right 2 l))
;      (*set bot-left (child-ref!! bot-left 1 l))
       (*set bot-right (child-ref!! bot-right 2 l)))
     (*when (valid-level=?? l max-valid-level)
       (*set sum (+!! left right top bot))))))

;;;----------------------------------------------------------------
;;; topological class ;; This function computes the border-edge-count,
;; and in tandem labels topological class. sum is a field pvar
;; with enough bits to hold the largest possible result (i.e., the
;; perimeter of the image.)

;; This operation incorporates the computations of SUM-BORDER-EDGES,
;; rather than calling it, for the following important reason:
;; in an in-place implementation, border-edge-counts are
;; only available for maximal valid regions at the end of a call to
;; sum-border-edges. To implement the precedence rules on topological
;; class labels, labels must be
;; assigned "on the fly", before they are possibly overwritten by larger
;; scale results.
```

```
(defvar bedge0-type-code 30.)
(defvar bedge2-type-code 10.)
(defvar bedge4-type-code 20.)

(*defun LABEL-TYPE-1 (bitmap max-valid-level type)
  (declare (type (field-pvar 1) bitmap)
       (type (field-pvar (pvar-length type)) type)
       (type (field-pvar (pvar-length max-valid-level)) max-valid-level))
   (*let (top bot left right top-left bot-left top-right bot-right sum mfl)
     (declare (type (field-pvar 16) top left bot right sum mfl)
          (type (field-pvar 1) top-left bot-left bot-right top-right))
     (*set sum (!! 1) type (!! 0))      ;null value---odd sums impossible.
     (label-full-scale bitmap mfl)
     (*set top (!! 0) left (!! 0) bot (!! 0) right (!! 0)
         top-left bitmap bot-left bitmap bot-right bitmap top-right bitmap)
     (loop for I from 1 to top-chunking-level do
       (when (oddp I)
 ;       (*set top (child-ref!! top 1 I))
         (*set bot (child-ref!! bot 2 I))
         (*set left (+!! (child-ref!! left 1 I) (child-ref!! left 2 I)
             (not=01!! (child-ref!! bot-left 1 I) (child-ref!! top-left 2 I))))
         (*set right (+!! (child-ref!! right 1 I) (child-ref!! right 2 I)
             (not=01!! (child-ref!! bot-right 1 I) (child-ref!! top-right 2 I))))
 ;       (*set top-left (child-ref!! top-left 1 I))
 ;       (*set top-right (child-ref!! top-right 1 I))
         (*set bot-left (child-ref!! bot-left 2 I))
         (*set bot-right (child-ref!! bot-right 2 I)))
       (when (evenp I)
 ;       (*set left (child-ref!! left 1 I))
         (*set right (child-ref!! right 2 I))
         (*set top (+!! (child-ref!! top 1 I) (child-ref!! top 2 I)
             (not=01!! (child-ref!! top-right 1 I) (child-ref!! top-left 2 I))))
         (*set bot (+!! (child-ref!! bot 1 I) (child-ref!! bot 2 I)
             (not=01!! (child-ref!! bot-right 1 I) (child-ref!! bot-left 2 I))))
 ;       (*set top-left (child-ref!! top-left 1 I))
         (*set top-right (child-ref!! top-right 2 I))
 ;       (*set bot-left (child-ref!! bot-left 1 I))
         (*set bot-right (child-ref!! bot-right 2 I)))
       (*when (valid-level=?? I max-valid-level)
         (*set sum (+!! left right top bot))
         (*case sum
           (0 (*unless (valid-level=?? I mfl)
                (*set type (!!f bedge0-type-code))))
           (4 (*when (<!! type (!!f bedge4-type-code))
                (*set type (!!f bedge4-type-code))))
           (2 (*when (zerop!! type)
                (*set type (!!f bedge2-type-code)))))))))

(defun LABEL-TYPE (bitmap type)
  (*let (max-valid-level)
    (declare (type (field-pvar 8) max-valid-level))
    (label-valid-scale bitmap max-valid-level)
    (label-type-1 bitmap max-valid-level type)
    (project-max-valid-value type type max-valid-level)))
```

What is claimed:

1. A method of operating a system that includes memory and a processor connected for accessing the memory, the method comprising steps of:

storing in the memory image data defining an image that includes a plurality of pixels, the image data including a pixel data item for each of the pixels; each pixel having four neighboring pixels; and operating the processor to produce a hierarchy of levels of border attribute data items by operating on the pixel data items, each border attribute data item indicating a border attribute of an analysis region of the image; the levels further including a lowest level and a sequence of higher levels, each of the higher levels having a next lower level in the hierarchy; the step of operating the processor comprising substeps of:

operating on each of the pixel data items to produce a starting border attribute data item, the lowest level of the hierarchy including the starting border attribute data items; each pixel's starting border attribute data item including four values, each value indicating whether the image includes an edge between the pixel and one of its neighboring pixels; and for each of the higher levels, producing each border attribute data item of the level by combining a set of the border attribute data items of the next lower level.

2. The method of claim 1 in which the substep of operating on each of the pixel data items comprises a substep of operating on each pixel's pixel data item and on the pixel data item of each of the pixel's neighboring pixels to produce the pixel's starting border attribute data item.

3. A method of operating a system that includes memory and a processor connected for accessing the memory, the method comprising steps of:

storing in the memory image data defining an image that includes a plurality of pixels, the image data including a pixel data item for each of the pixels; and operation the processor to produce a hierarchy of levels of border attribute data items by operating on the pixel data items, each border attribute data item indicating a border attribute of an analysis region of the images; each border attribute data item including a set of values including first, second, third, and fourth numeric values; the levels further including a lowest level and a sequence of higher levels, each of the higher levels having a next lower level in the hierarchy; the step of operating the processor comprising substeps of:

operating on each of the pixel data items to produce a starting border attribute data item, the lowest level of the hierarchy including the starting border attribute data items; and for each of the higher levels, producing each border attribute data item of the level by combining a set of the border attribute data items of the next lower level; the set of border attribute data items that are combined to produce a first one of the border attribute data items at a first one of the higher levels of the hierarchy including first and second lower level border attribute data items at the next lower level of the first higher level; the substep of producing each border attribute data item of the first higher level comprising a substep of producing the first and third numeric values of the first border attribute data items of the first higher level by adding the first and third numeric values, respectively, of the first and second lower level border attribute data items and producing the second and fourth numeric values of the first border attribute data item of the first higher level by selecting one of the second and fourth numeric values, respectively, of the first and second lower level border attribute data items.

4. The method of claim 3 in which the hierarchy includes a second higher level, the first higher level being the next lower level of the second higher level, the set of border attribute data items that are combined to produce a first one of the border attribute data items at the second higher level including the first border attribute data item at the first higher level and a second border attribute data item at the first higher level; the substep of producing each border attribute data item of the second higher level comprising a substep of producing the second and fourth numeric values of the first border attribute data item of the second higher level by adding the second and fourth numeric values, respectively, of the first and second border attribute data items of the first higher level and producing the first and third numeric values of the first border attribute data item of the second higher level by selecting one of the first and third numeric values, respectively, of the first and second border attribute data items of the first higher level.

5. The method of claim 3 in which the analysis region of each of the border attribute data items is rectangular with first, second, third, and fourth borders and with at least one border pixel in each border; the first, second, third, and fourth numeric values indicating a number of pixels that meet a border attribute criterion in the first, second, third, and fourth borders of the analysis region, respectively.

6. The method of claim 5 in which each indicated number of border pixels is a total number of border pixels that meet the border attribute criterion in the border.

7. A method of operating a system that includes memory and a processor connected for accessing the memory, the method comprising steps of:

storing in the memory image data defining an image that includes a plurality of pixels, the image data including a pixel data item for each of the pixels; and operating the processor to produce a hierarchy of levels of border attribute data items by operating on the pixel data items, each border attribute data item indicating a border attribute of an analysis region of the image; each border attribute data item at each level including a set of values including first and second boolean values; the levels further including a lowest level and a sequence of higher levels, each of the higher levels having a next lower level in the hierarchy; the step of operating the processor comprising substeps of:

operating on each of the pixel data items to produce a starting border attribute data item, the lowest level of the hierarchy including the starting border attribute data items; and for each of the higher levels, producing each border attribute data item of the level by combining a set of the border attribute data items of the next lower level; the set of border attribute data items that are combined to produce a first one of the border attribute data items at a first one of the higher levels of the hierarchy including first and second lower level border attribute data items at the next lower level of the first higher level; the substep of producing each border attribute data item of the first higher level comprising a substep of producing the first boolean value of the first border attribute data item of the first higher level by logically combining the first boolean values of the first and second lower level border attribute data items and producing the second boolean value of the first border attribute data item of the first higher level by selecting one of the second boolean values of the first and second lower level border attribute data items.

8. The method of claim 7 in which the hierarchy includes a second higher level, the first higher level being the next lower level of the second higher level, the set of border attribute data items that are combined to produce a first one of the border attribute data items at the second higher level including the first border attribute data item at the first higher level and a second border attribute data item at the first higher level; the substep of producing each border attribute data item of the second higher level comprising a substep of producing the second boolean value of the first border attribute data item of the second higher level by logically combining the second boolean values of the first and second border attribute data items of the first higher level and producing the first boolean values of the first border attribute data item of the second higher level by selecting one of the first boolean values of the first and second border attribute data items of the first higher level.

9. The method of claim 7 in which the analysis region of each of the border attribute data items is rectangular with first, second, third, and fourth borders and with at least one border pixel in each border; the first and second boolean values indicating whether any pixels meet a border attribute criterion in the first and second borders of the analysis region, respectively.

10. The method of claim 9 in which the border attribute criterion is met by one of the pixels that is black and has a neighboring black pixel outside the border.

11. The method of claim 10 in which each pixel's starting border attribute data item indicates whether the pixel and each of its neighboring pixels are connected.

12. The method of claim 11 in which each pixel's starting border attribute data item indicates that the pixel is connected only if the pixel is black.

* * * * *